United States Patent
Vacherand et al.

(10) Patent No.: US 6,650,228 B1
(45) Date of Patent: Nov. 18, 2003

(54) METHOD AN SYSTEM FOR READING A DYNAMIC SET OF TAGS BEARING DISTINCT ID CODES

(75) Inventors: François Vacherand, Le Pont de Claix (FR); Elisabeth Crochon, Poisat (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/261,974

(22) Filed: Mar. 3, 1999

(30) Foreign Application Priority Data

Mar. 12, 1998 (FR) .............................. 98 03060

(51) Int. Cl.[7] .................................................. H04Q 7/06
(52) U.S. Cl. .................... 340/10.33; 340/10.2; 340/3.51
(58) Field of Search .............................. 340/10.2, 3.51, 340/10.33, 10.31, 10.32, 10.52, 10.51; 235/375; 342/44, 51

(56) References Cited

U.S. PATENT DOCUMENTS

| | | | |
|---|---|---|---|
| 4,862,160 A | | 8/1989 | Ekchian et al. |
| 5,216,419 A | * | 6/1993 | Fujisaka et al. ............. 235/375 |
| 5,602,538 A | * | 2/1997 | Orthmann et al. ......... 340/10.2 |
| 5,856,788 A | * | 1/1999 | Walter et al. ............... 235/375 |
| 5,920,261 A | * | 7/1999 | Hughes et al. ............. 340/3.51 |
| 6,025,780 A | * | 2/2000 | Bowers et al. ........... 340/572.3 |

FOREIGN PATENT DOCUMENTS

| | | |
|---|---|---|
| EP | 0405695 | 1/1991 |
| EP | 0405695 A1 * | 1/1991 |
| EP | 0777194 | 6/1997 |
| FR | 2677135 | 12/1992 |

* cited by examiner

*Primary Examiner*—Michael Horabik
*Assistant Examiner*—Hung Dang
(74) *Attorney, Agent, or Firm*—Thelen Reid & Priest LLP; Robert E. Krebs

(57) ABSTRACT

The invention relates to a method and system for reading a dynamic set of tags present in the electromagnetic field of a polling device, consisting in updating cyclically a list of tags present in the electromagnetic field and minimizing the time for checking the presence of tags already identified, by assigning to each of these tags a sequence number whose binary size is significantly smaller than that of the ID code and that allows to realize a "call" of the tags present by enumeration.

7 Claims, 5 Drawing Sheets

| TAG 1 | | | | | | | | |
|---|---|---|---|---|---|---|---|---|
| BIC | 1 | 0 | 1 | 1 | 1 | 1 | 1 | 1 |
| RNO | 1 | 1 | 1 | 1 | 1 | 1 | 1 | 1 |
| CNO | 4 | 0 | 1 | 2 | 2 | 3 | 3 | 3 |
| DNO | 0 | 0 | 0 | 0 | 0 | 0 | 0 | 0 |

| TAG 2 | | | | | | | | |
|---|---|---|---|---|---|---|---|---|
| BIC | 1 | 0 | 0 | 1 | 1 | 1 | 1 | 1 |
| RNO | 2 | 2 | 2 | 2 | 2 | 2 | 2 | 2 |
| CNO | 4 | 0 | 1 | 2 | 2 | 3 | 3 | 3 |
| DNO | 0 | 1 | 0 | 0 | 0 | 0 | 0 | 0 |

TAG 3
BIC
RNO       TAG 3 LEAVING DURING THIS CYCLE
CNO
DNO

| TAG 4 | | | | | | | | |
|---|---|---|---|---|---|---|---|---|
| BIC | 1 | 0 | 0 | 0 | 0 | 1 | 1 | 1 |
| RNO | 4 | 4 | 4 | 4 | 4 | 3 | 3 | 3 |
| CNO | 4 | 0 | 1 | 2 | 2 | 3 | 3 | 3 |
| DNO | 0 | 3 | 2 | 1 | 0 | 0 | 0 | 0 |

| INTERROGATOR | | | | | | | | |
|---|---|---|---|---|---|---|---|---|
| CNE | 4 | 0 | 1 | 2 | 2 | 3 | 3 | 3 |

METHOD AN SYSTEM FOR READING A DYNAMIC SET OF TAGS BEARING DISTINCT ID CODES

FIELD OF THE INVENTION

The invention relates to a method for reading a set of tags, each with an ID code and capable of randomly going into or out of an electromagnetic field transmitted by a polling device. It also relates to a system implementing this method.

The invention is applied in the field of recognizing persons bearing badges, or in the fields of counting and controlling objects bearing tags, such as luggage at an airport, goods in a store, or else products in a production line.

STATE OF THE ART

Professionals presently know numerous systems and methods for identifying tagged objects. Most of them apply to reading multiple tags.

Some of these methods provide retransmission of the tag code, after a random delay peculiar to each tag, when a collision of messages being transmitted simultaneously by the tags is detected.

There are also methods consisting in leaving a particular time slice for a tag's response. Each time slice is determined uniquely by the ID code of each tag. However, these methods do not optimize the transaction time between the polling system and the set of tags. Moreover, the time required by the method for reading all the tags can be based on the drawing of random numbers in addition to the hazard of the number of tags present which implies that it is not deterministic.

Another method, only adapted for a static set of tags to be read once, is described in the French patent FR-A-2 677 135. This patent application explains how the polling system makes the tags present in the polling field of said system successively supply each bit of their ID code until it is entirely identified. For this purpose, the tags respond to a control signal from the polling device; when a tag detects that the code currently being identified is different from its own, it temporarily locks up (i.e. it goes "silent") so that the identification cycle continues with the other tags until there is only one unlocked tag left; the code of this tag is then identified. At the end of the identification cycle, upon a single command from the polling device, the identified tag locks up permanently and the other tags end their temporary locking. The identification method is then reinitialized for identifying another tag. These operations are repeated as many times as required for identifying all the tags individually.

However, this technique can only be applied to a static set of tags that can only be read once. Therefore, it cannot be applied to a dynamic set of tags, i.e. to tags that can randomly go into and out of the electromagnetic field of the polling system.

Furthermore, the polling time of the tags according to this method is all the longer as the number of tags is high; consequently, this method is rather lengthy, once the number of tags is high and it is desired to restart a new read cycle by temporarily removing the electromagnetic field transmitted by the polling device to cancel the permanent locking of the tags already identified.

DISCLOSURE OF THE INVENTION

It is precisely the object of the invention to remedy the disadvantages of the previously mentioned techniques. For this purpose, it provides a method and system for reading a dynamic set of tags present in the electromagnetic field of a polling device, where the time for checking the presence of the tags already identified is minimized by assigning to each of these tags a sequence number whose binary size is significantly smaller than that of the ID code.

More precisely, the invention relates to a method for reading a dynamic set of tags, each with a distinct ID code and located in the electromagnetic field of a polling device, consisting in identifying the tags by successively reading their codes by means of transmitting and receiving signals between the polling device and the tags. This method is characterized by consisting in carrying out a first read cycle during which each identified tag is locked and during which a sequence number is assigned to each of the identified tags so as to enable the creation of a list of all the tags available in the field of the polling device, then during subsequent read cycles, carrying out an update of this list by reactivating the already listed tags, by checking from the sequence number of these tags those that are still present in the field and removing those that have left it and adding the tags that have just entered it.

Advantageously, when updating the list of tags, the sequence numbers of the tags are modified depending on when the tags go out of and into the field, so that the sequence numbers of the list are consecutive.

According to the invention, the sequence number of each tag is determined, in parallel, by the tag itself and by the polling device, from the information exchanged by the tags and said polling device when identifying the tags.

In this case, the sequence number can be initialized automatically at the polling device and at each tag.

The invention also relates to a system for reading a dynamic set of tags via a polling device, implementing the above method and wherein the tags and the polling device each comprise signal transmitting/receiving means and an ID code storage memory. This reading system is characterized by the polling device comprising:
  a pointer for pointing to its storage memory;
  a counter for counting the number of tags present; and
  a register for storing the number of current tags;
  it is also characterized by each tag comprising:
    a first ID code read status latch;
    a temporary lock latch and a cyclic lock latch;
    a storage register for its sequence number;
    a sequence number counter; and
    a sequence number decounter.

DESCRIPTION OF THE PREFERRED EMBODIMENTS OF THE INVENTION

The method of the invention consists in constantly listing a dynamic set of radio tags present in the electromagnetic field of a polling device (hereinafter just called "interrogator") and minimizing the time for checking the presence of the tags in this electromagnetic field, so as to take into account very rapidly the asynchronous arrival or departure of a tag within this electromagnetic field.

More precisely, this minimization of the time for checking the presence of the tags is achieved by assigning to each of the tags a sequence number that then enables presence or absence of the tag in the electromagnetic field to be checked without requiring a complete rereading of the tag's ID code.

It should be noted that considering the realistic maximum number of tags that can be present simultaneously in the field of an interrogator (due to the interrogator's physical and electromagnetic limitations), the sequence number assigned to each tag will have a bit length much shorter than the ID code length. E.g., with an 8 bit long sequence number it can be envisaged to manage simultaneously 255 tags, each having an ID code of 64 or 128 bits, for instance.

The method of the invention thus allows for permanently keeping a tag list up-to-date and to do so with the shortest refresh time possible.

Figure 1:
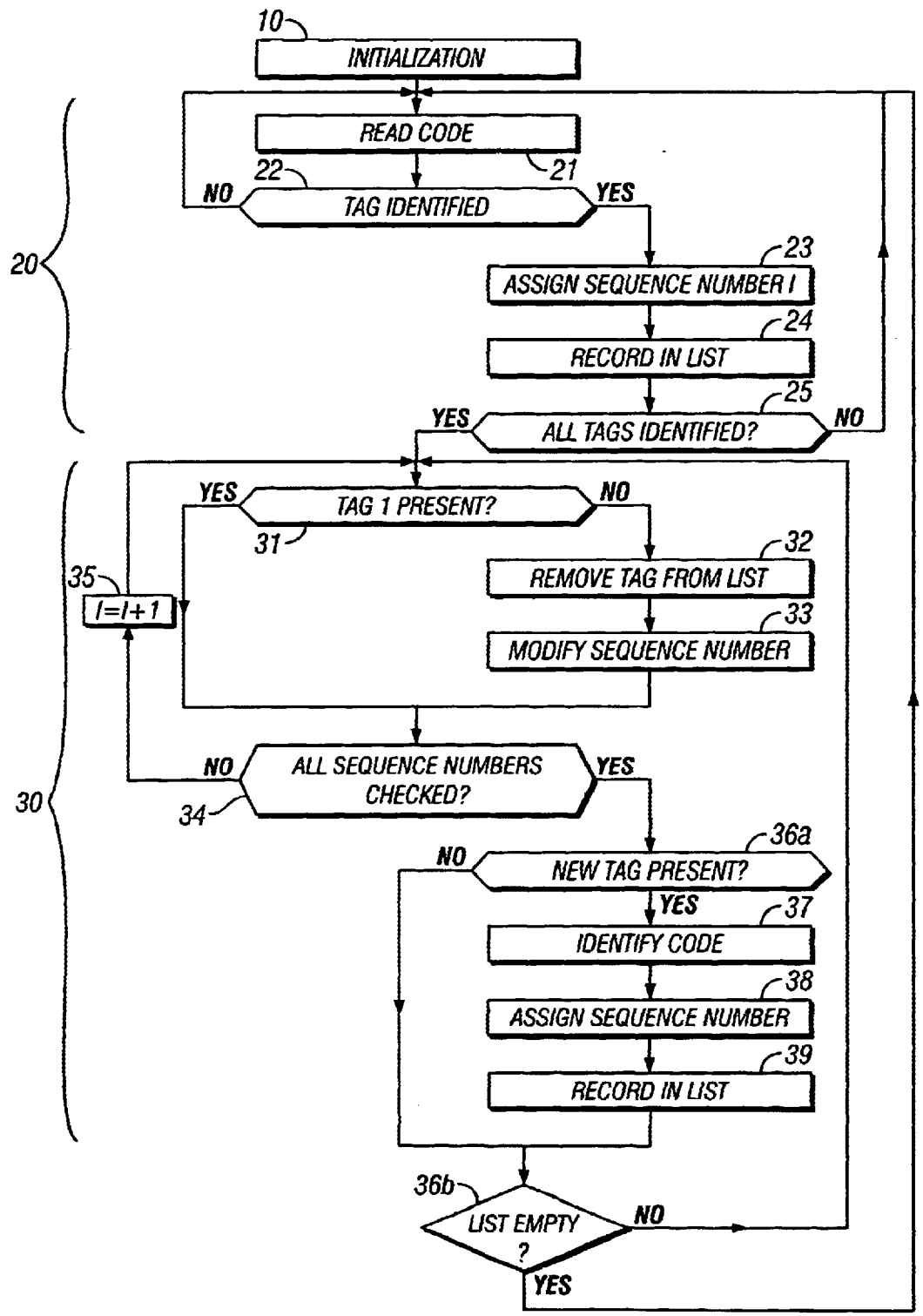
FIG. 1 schematically represents the general steps of the inventive method.

In FIG. 1, the general flowchart of the inventive method is represented. First of all, this method consists of an initialization of the polling device. This initialization phase 10 namely consists in checking whether at least one tag is present in the electromagnetic field of the identifier. If this presence polling is positive, the interrogator then attempts a single read based on the hypothesis that a single tag has arrived. If the code read is incorrect, it assumes that several tags have entered the field; it then runs initialization cycle 20. Such an initialization phase is described exactly in the patent application with registration number 96 15434, filed in the name of the applicant. After initialization 10, this method consists of a read cycle for identifying all the tags present in the interrogator's field; this read cycle has reference numeral 20, in FIG. 1. The method of the invention then comprises a series of update cycles, referenced as 30, that consist in checking whether the tags of the list have left the interrogator's field, or whether on the contrary, new tags have entered the field of the interrogator.

When the identifier has been initialized, 10, the tag identification phase 20 (or read cycle) is implemented; the latter consists first of all in reading the codes of each of the tags. This tag identification phase roughly takes up the method described in the patent FR-A-2 677 135. In fact, this identification phase 20 consists in reading each bit making up the ID code of each of the tags. This bit by bit reading is represented by block 21 in FIG. 1. A test 22 then consists in checking whether a tag has been entirely identified; if no tag has been identified, then the bit by bit reading 21 continues; otherwise, i.e. if a tag code has been determined, then this identified-tag is assigned a sequence number I (block 23) and this sequence number I is recorded in a list (block 24). This sequence number may vary from 1 to N, N being the total number of tags. A test 25 then consists in checking whether all the tags present in the field of the interrogator have been identified; should this not be the case, identification phase 20 restarts at the beginning, i.e. at read block 21; on the contrary, if all the tags have been identified, it then starts a first cycle 30 for updating the list, followed by a plurality of update cycles, all identical and carried out cyclically.

As can be seen in FIG. 1, the tag identification cycle (also called list initialization step) ends with the interrogator creating a first list of tags present. At this time, the cyclic lock bit (in contrast with the temporary lock bits) of the tags is activated. In fact, this cyclic lock bit corresponds to the so-called "permanent" lock bit of the French patent FR-A-2 677 135; however, in the invention, this locking is not permanent but cyclic as at each update cycle 30, this bit is reactivated so that the tag can be polled again.

The first update cycle 30 comprises a first step 31 for controlling the presence of tag I. If this tag I is not present in the field of the interrogator, then it is deduced that it has left the field; consequently, this tag is deleted from the list (step 32), then all the sequence numbers of the tags in the list are modified (step 33). A test 34 then consists in checking whether all the sequence numbers have actually been checked.

If tag I has been detected as being present in the field of the interrogator, then the method directly proceeds to test 34.

If not all the sequence numbers have been checked, then the method proceeds to the next sequence number I+1 (step 35) and restarts the method from test 31.

When all the sequence numbers of the list have actually been checked, then we proceed to test 36a that consists in checking the possible presence of new tags in the interrogator's field.

If the identifier detects the presence of one or several new tags in its electromagnetic field, then it carries out a code identification procedure 37 for these new tags; this code identification procedure 37 comprises steps identical to those of blocks 21 and 22. The interrogator then assigns a sequence number to each of the new tags (step 38) and records it in the list (step 39). A new update cycle is then carried out. If during test 36a, the interrogator does not detect any new tag in its field, then the first update cycle ends and a new update cycle is started by returning to test 31.

This update phase 30 can be broken down into two main steps:

a step for checking the presence of the tags listed during identification cycle 20 (comprising steps 31 to 35), during which possible tag departures are managed. This checking of tag presence uses the sequence numbers for checking as fast as possible the presence of the tags already listed in the interrogator's field. A "start of verification" message unlocks the cyclic lock bit (to be described later) of each of the tags. This bit is locked again when the tag has responded that it is present. In case one or several tags have left, the sequence numbers are reorganized;

a second step comprising blocks 36a to 39 and during which the possible arrival of new tags in the interrogator's field is checked; these new tags are then added to the list. This step is roughly the same as the already described list initialization phase 20, except for the fact that the sequence numbers follow those of the current list.

The interrogator thus permanently keeps a list of the set of tags present. This list is put in order both according to the chronological tag arrival and according to the sequential relationship created by the multiple read algorithm based on the ID code weighting.

If the list is empty after step 39 (test 36b), then the system returns to tag awaiting mode and continues at the beginning of phase 20; on the contrary, if the list is not empty, the system continues with update cycle 30.

Figure 5:
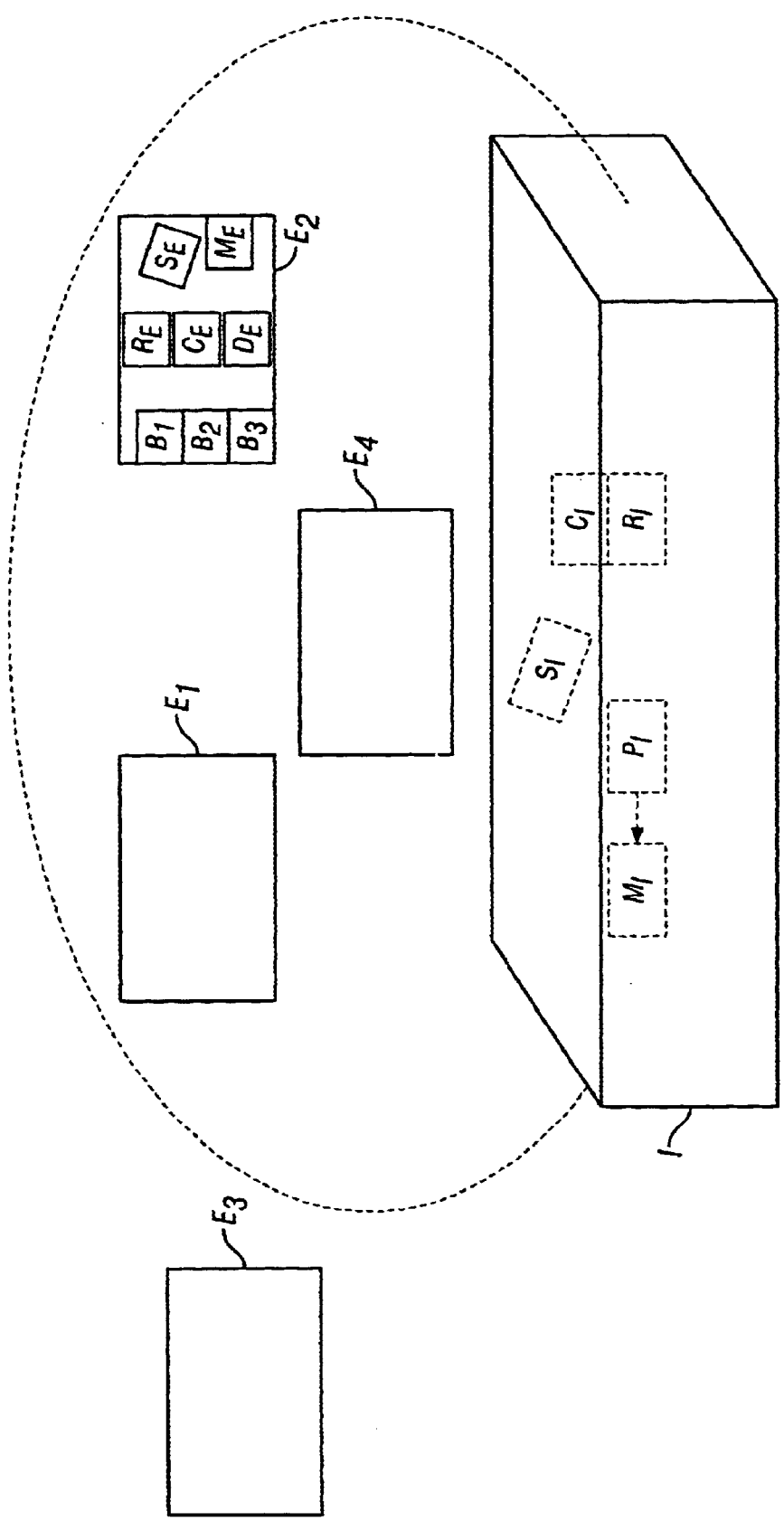
FIG. 5 schematically represents the tag reading system of the invention.

The method that has just been described is globally implemented by a tag reading system comprising on the one hand a polling device, and on the other hand tags. This system is represented in FIG. 5.

The polling device, referenced as I and more simply called "interrogator", comprises at least the following elements:

sequencing means $S_I$;

an ID code storage memory $M_I$;

a pointer $P_I$ pointing to the storage memory;

a counter $C_I$ for the number of tags present; and a register $R_I$ for storing the number of current tags.

Each of the tags $E_1$, $E_2$, $E_3$, $E_4$ comprises the following means:

sequencing means $S_E$;

an ID code storage memory $M_E$;

a first ID code read status latch $B_1$;

two lock latches:

a temporary lock latch $B_2$ for the code identification phase; and a cyclic lock latch $B_3$ for the tag presence verification phase;

a storage register $R_E$ for its sequence number;

a sequence number counter $C_E$; and a sequence number decounter $D_E$.

In view of simplifying the figure, only the means making up tag $E_2$ have been represented, tags $E_1$, $E_3$, $E_4$ being the same as tag $E_2$.

As it has been seen, each tag comprises a sequence number counter CE that enables it to calculate its sequence number automatically; this counter increments the sequence number by detecting and counting the other tags identified by the interrogator I during its counting cycle. Only tags present at the beginning of the cycle are taken into account. This counter is initialized at 0 at the beginning of the counting cycle, i.e. cycle 20 in FIG. 1. It increments each time the tag receives the following commands:

counting "GO AHEAD" (corresponding to "reading 1") during the list verification phase, whatever the status, i.e. whether the tag has already been listed, whether it has not yet been listed, whether it is the first read phase or whether it is an update read;

"single read" (followed by "code read correctly") in the case of a tag not yet listed; or "beginning of multiple read sequence" and at each receipt of the message "code read correctly" (see appendix), in the case of a tag not yet listed.

This counting is carried out until the tag is either checked if it has already been listed, or until it is identified if this is the first time it is read. Afterwards, the count is frozen until the next update cycle. At the end of the first read, or during verification, the contents of counter $C_E$ is saved in the sequence number register $R_E$.

For one cycle, the sequence number saving register $R_E$ stores the value of the tag's sequence number. It is initialized to 0 at tag power-up time, then initialized according to the current sequence number, after the first ID code read. It is updated after each verification of presence by the interrogator.

Sequence number decounter $D_E$: at the beginning of the sequence corresponding to the beginning of list verification command, this decounter is loaded with the value of the sequence number contained in the register. It is immediately decremented. At each counting "GO AHEAD" received, i.e. each time the interrogator retransmits "reading 0", or "reading 1", the contents of this decounter is decremented. When it reaches the value 0, the tag sends a presence signal in the form of a "bit is 1" signal. Next, the tag can save the contents of the counting register and lock up until the next cycle.

As the reading system of the invention comprises on the one hand an interrogator and on the other hand tags, it will be understood easily that the method of the invention can be broken down into two processing phases: one processing phase realized by the tag and one processing phase realized by the interrogator.

From the interrogator's point of view, also two cycles can be distinguished defined depending on the status of the tag list currently indexed:

when the list is empty: an initialization cycle (corresponding to reference 10 of FIG. 1); and when the list is not empty: an update cycle (corresponding to reference 30 of FIG. 1).

From the tag's point of view, it is also possible to distinguish two cycles defined depending on the tag's status:

if the tag has not been read: a first read cycle (corresponding to reference 20 or 37 of FIG. 1); and if the tag has already been read: a sequence number update cycle (corresponding to reference 30 of FIG. 1).

A tag can only participate in a counting cycle (i.e. a sequence during which the tags are being counted) if it receives the message corresponding to the beginning of one of the two previously described cycles, and this is done so that all tags present can be counted. If the tag does not receive this message, then it waits for the beginning of the next cycle.

As it has been seen, the interrogator and the tag may each be in two modes. The possible combinations of these modes then produce several possible cases:

a) The list is empty and the tag is being read for the first time: if the tag is alone in the interrogator's field, then it responds to the single read prompting by sending its ID code and it initializes its sequence number register to 1. If several tags are present and therefore have not yet been read, the multiple read sequence is launched. In this case, each tag counts the number of tags correctly read until it is read itself. This number will be its sequence number and it will be saved in an internal register upon receipt of the confirmation that its code has been read correctly. The tag's internal counter may continue to count so as to have the information of the total number of tags present available on the tag if required.

b) The list is not empty and the tag is being read for the first time: each new tag counts the number of tags still present during the list verification phase. It does so by evaluating the information returned by the interrogator, indicating the presence or absence of the tag already read. Starting from there, it runs a mechanism similar to the one of case a). If the tag is alone, it initializes its sequence number to the count of tags previously read, plus 1. If several tags have arrived recently, it continues the counting sequence by incrementing the tag count at each reception of a code read correctly message until it is read correctly itself.

c) The list is not empty and the tag has already been read: the tag does not respond to the list verification command, by transmitting a presence signal "1", when it is its turn to transmit. This instant is determined when the internal decounter reaches the value 0. It is initialized with the sequence number value at the beginning of the list verification phase and decounts the tags already checked as present or not.

Figure 2A:
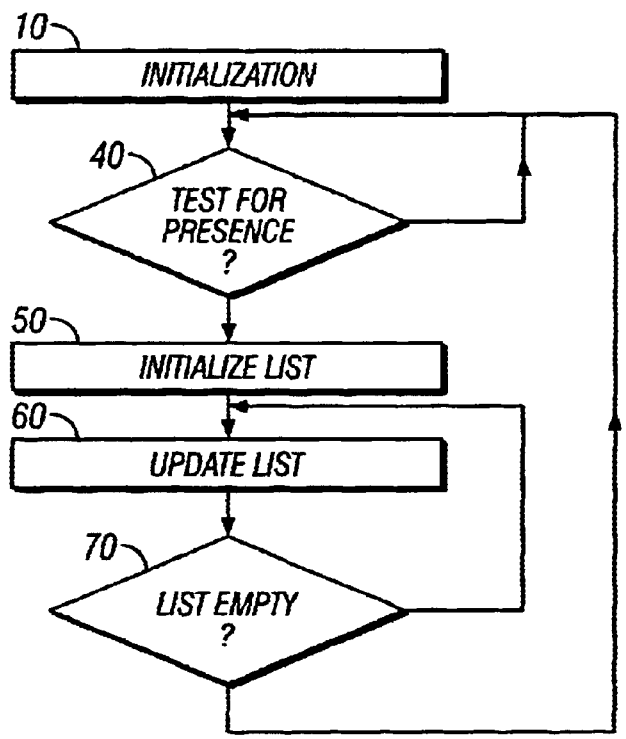
FIG. 2A schematically represents the operational steps of the polling device.

In FIG. 2A, the general operation of the interrogator is represented. The operation of the interrogator consists of an initialization 10, then of a presence test 40 for checking the presence of tags in its electromagnetic field. If no tag is detected, then the method loops internally, i.e. the processing continues at the beginning of the presence test until a tag reaches the electromagnetic field.

On the contrary, if the interrogator detects the presence of at least one tag in its electromagnetic field, then the method consists in carrying out an initialization 50 of the list, then an update 60 of this list and finally a test 70 for checking the list status (i.e. whether it is empty of not).

If the list is empty, then the processing returns to the beginning of the presence test 40. If the list is not empty, then the processing consists in returning to the beginning of list update step 60.

Figure 2B:
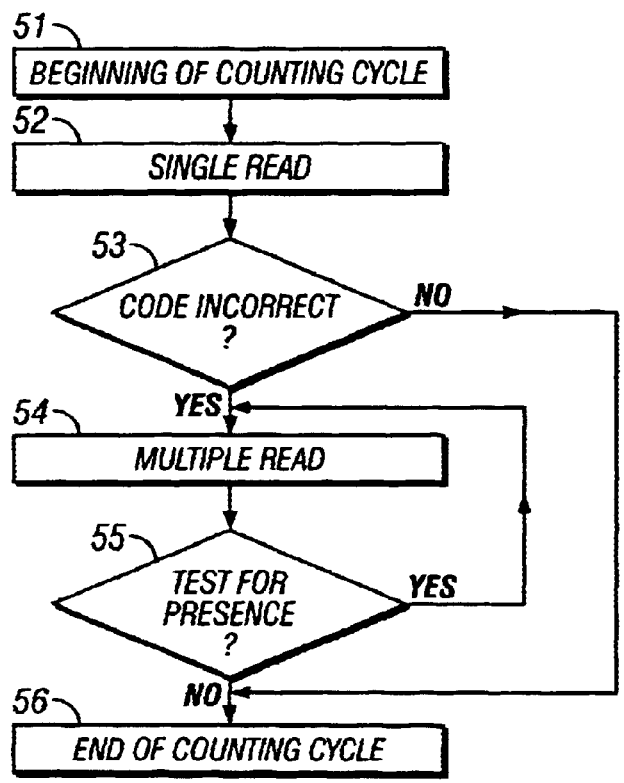
FIG. 2B schematically represents the steps for initializing the tag list.
Figure 2C:
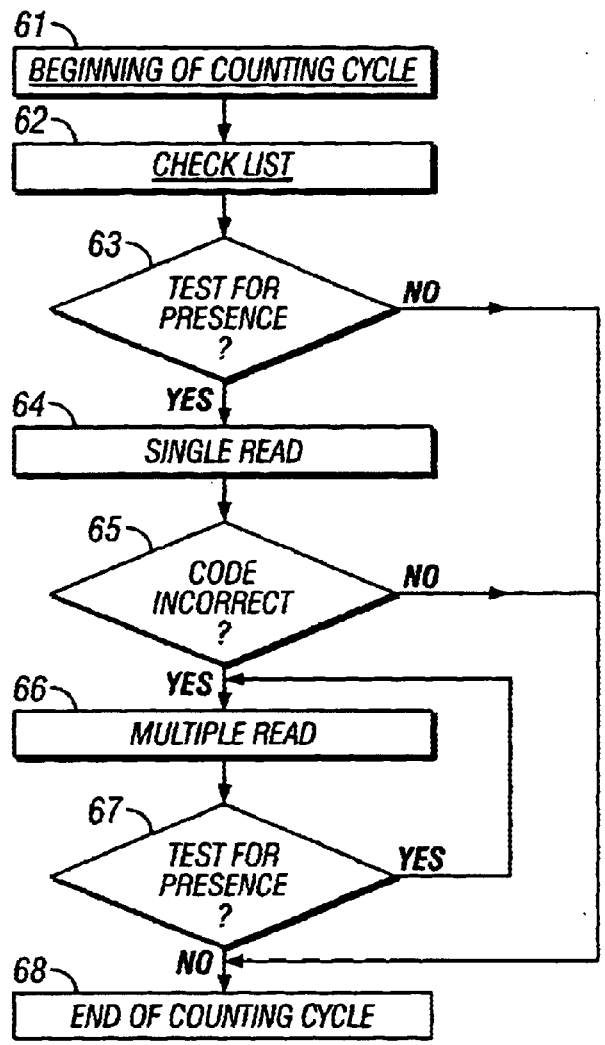
FIG. 2C schematically represents the steps for updating the tag list.

In FIG. 2B, then in FIG. 2C, the respective list initialization 50 and list update 60 steps are represented in further detail.

Thus, FIG. 2B shows the operation of the interrogator during list initialization. The list initialization phase takes into account the possibility that there are several tags in the electromagnetic field of the interrogator and if, and only if, it has received a beginning of counting cycle message.

It comprises a beginning of counting cycle 51, then a single read attempt of a tag 52, i.e. the interrogator presumes that there is only one tag in its polling field; at 53, the interrogator checks whether the previously read code is incorrect or not. If the code is incorrect, then the processing proceeds with multiple read step 54, of the type described in the prior patent FR-A-2 677 135. This step 54 is the execution of a sequence of the multiple read algorithm with the number of tags being incremented by 1 if the code is read correctly.

In step 55, the interrogator carries out a tag presence test, i.e. it checks whether unread tags are present. Should this be the case, processing continues at the beginning of multiple read step 54. Otherwise, it is considered that the counting cycle is finished (reference 56). In the case that the incorrect code test (block 53) turns out to be negative, the method then directly proceeds to the beginning of the end of counting cycle step 56.

In FIG. 2C, the flowchart for the interrogator updating the list is represented in further detail. This list update phase 60 takes into account the possibility that there are several tags reaching the interrogator's field almost simultaneously. This phase comprises a first beginning of counting cycle phase 61, next a step 62 of the interrogator launching an instruction for verifying the presence of tags already listed, with the possible withdrawal of tags that are no longer present in the polling field. The operation of the interrogator then comprises a presence test step 63. This presence test consists in checking whether new tags are present in the interrogator's field. Should this be the case, then the method proceeds to the next single read step 64. Should this not be the case, it proceeds to the beginning of the end of counting cycle step 68. In fact, steps 64, 65, 66 and 67 respectively correspond to steps 52, 53, 54 and 55 of FIG. 2B. Therefore, the method will not described again for these steps 64 to 67.

Figure 3:
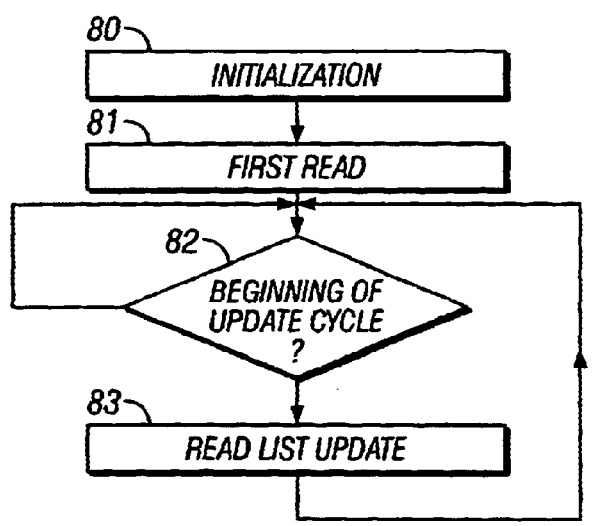
FIG. 3 schematically represents the operational steps of a tag.

In FIG. 3, the general operation of a tag is represented. When the tag is self-powered by entering the electromagnetic field of the interrogator, it resets, and the first read bit is set to 0. Then it waits for a command from the interrogator to activate it. This command will be either a single read order in which case it sends its ID code, or the beginning of the multiple read protocol. The tag will respond to no other order from the interrogator and if, and only if, it has received a beginning of counting cycle message.

When it has been read according to one of the two above mentioned modes, namely single read or multiple read, the tag locks up for the rest of the cycle for all read requests of its code or the verification of its sequence number (cyclic lock bit set to 1 and first read bit set to 1).

When the tag responds to a presence test and when the interrogator has acknowledged it, it locks up for the rest of the list update cycle for all reads or ID code verifications. Its cycle lock bit is set to 1. It is reset to 0 at the beginning of each cycle.

A tag entering the polling field can very well hear a command and not be heard by the interrogator. In fact, the electromagnetic field radiated by the interrogator can be strong while the mutual coupling is still too weak because of the distance for the tag to be heard by the interrogator. In view of avoiding confusion, the interrogator sends an acknowledging signal to the tag for informing it that it has been heard.

More precisely, the operation of the tag consists of a tag initialization step 80, next a first read step 81. A test 82 then consists in checking whether this is the beginning of an update cycle. If it actually is the beginning of an update cycle, then processing proceeds with a list update read. Otherwise, processing continues at test 82.

After list update read 83, processing continues at the beginning of test 82.

As it has been seen previously in FIG. 2C, at the beginning of the list update sequence, the interrogator sends a "list verification" instruction that is meant to check the presence of already listed tags. Therefore, only tags that have already been read are involved, i.e. whose first read bit is set to 1. Thus, when the interrogator transmits the "beginning of list verification" command (see appendix), all the tags already read during a preceding read cycle set their cycle lock bit to 0 so as to participate in the counting. Furthermore, all the tags already read transfer the value of the sequence number register decremented by 1 into their sequence number decounter. Moreover, all the tags reset their sequence number counter to 0; the interrogator places its ID code pointer at the beginning of the list; the maximum loop index is initialized with the contents of the register with the number of tags present counted by the interrogator and the interrogator's tag number counter is reset to 0.

Then, the cycle following loop index I is carried out N times (N being the number of tags present already read during the preceding counting cycle). Then, the tag with sequence number I transmits 1, if it is present, and if its sequence number decounter reaches the value 0; if it is not present, nothing is transmitted, which corresponds to transmitting 0 to the interrogator. Depending on the information received from the group of tags, the interrogator retransmits a "reading 0" or a "reading 1" message.

On the interrogator side, if it receives 0, i.e. if it does not receive anything at all, then the interrogator withdraws tag I from the list; on the contrary, if the interrogator receives 1, then it increments the tag counter by 1.

On the tag side, if it has not yet responded present and if the interrogator transmits a "reading 1" message (see appendix), then the tag increments its sequence number decounter by 1. On the contrary, it decrements its sequence number counter whatever the interrogator's transmission. Moreover, the tag saves the current value of the sequence number counter in its sequence number register, if the value of the sequence number counter is zero and sets its cycle lock bit to 1.

The steps that have just been described are carried out N times, i.e. as many times as there are tags already listed as present in the electromagnetic field.

Next, the interrogator transmits a "end of list verification" command (see appendix) and updates the number of tags.

The "beginning of list verification" commands allow for isolating the group of tags already present at the beginning of the counting cycle so that a tag entering the field after the beginning of the counting cycle does not participate in this cycle; its sequence number counter would be incorrect.

Figures 4A, 4B:
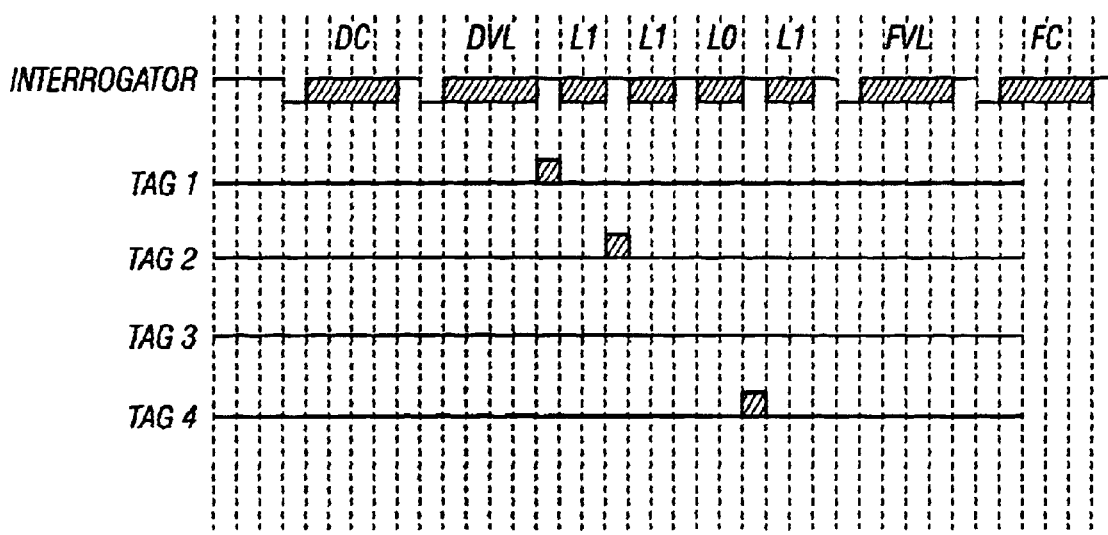
FIG. 4 represents the time chart for checking the tag list in an example where the list initially contains four tags.

In FIG. 4, the time chart of the list verification function is represented schematically.

In part A of this figure, a sample time chart has been represented in the case where there are four tags identified and already listed. The interrogator will therefore check the presence of these four tags. For this purpose, the interrogator first transmits a cycle start instruction, DC, then a "beginning of list verification" instruction, DVL, to which:

tag 1 responds by "1"; so the interrogator transmits "reading 1", L1, (see appendix);

tag 2 sends "1"; so the interrogator again transmits "reading 1";

tag 3 does not respond; so the interrogator transmits "reading 0", L0, (see appendix);

tag 4 also sends "1"; so the interrogator transmits "reading 1".

Then, the interrogator transmits an "end of list verification" message, then "end of cycle".

In part B of FIG. 4, the status of each of the four tags is represented, as well as that of the interrogator. More precisely, for each tag, the status of the counting cycle lock bit of each tag (BIC), the status of the preceding sequence number storage register (RNO), the status of the current sequence number counter (CNO) and the preceding sequence number decounter (DNO) has been noted. The status of the interrogator's present tag number counter (CNE) has also been noted.

In this part B of FIG. 4, it appears that no status is given for tag 3, as the latter has left the interrogator's electromagnetic field before the beginning of the list verification.

It should be noted that the method of the invention, that has just been described, can be associated with all writing methods, such as the one described in the patent application registered under number 96 15434, or the one described in the French patent application filed today by the applicant and titled "multiple read method and system for a dynamic set of tags with synchronization of communication between tags and reader". Also, in the method of the invention, the arborescence traversal multiple read method can be used, such as the one described in the French patent application filed today by the applicant and titled "multiple read method and system for a set of tags bearing distinct ID codes".

The main messages transmitted during one read and/or update cycle are as follows:

Code reading correct: this message informs the tag that has sent its code that the latter has been received correctly by the interrogator. It allows for managing functional boundary problems; it also enables the other tags that have not yet been read, or checked, to manage the incrementing of their sequence number counter.

Code reading incorrect: this message is sent by the interrogator to the tags in case of bad transmission. It allows for correctly managing the lock latches, as well as the sequence number counters.

Reading 0: this message is returned by the interrogator when the last bit sent by the tags is 0 during the execution of two particular commands (multiple read protocol and verification protocol).

Reading 1: this message is returned by the interrogator when the last bit sent by the tags is 1 during the execution of two particular commands (multiple read protocol and list verification protocol).

Beginning of counting: this command enables the tags to initialize the automatic sequence number management counters, then to receive certain messages for incrementing these counters.

End of counting: this command finishes the counting cycle. Sequence numbers are frozen until the next counting cycle.

Single read: this command activates a tag so that it transmits, in return, its complete lock code to the interrogator. This transmission takes place provided the read cycle lock bit is not active, i.e. if the tag has not yet been read or checked, during the current cycle. If this is true for several tags, then they will transmit simultaneously and the interrogator will see a "code read incorrect" by checking, e.g. the cyclic error detection calculation information CRC. Thus, it will be able to react accordingly and carry out a multiple read. This single read allows to gain time if there is only one tag present in the electromagnetic field.

Test of presence: this command is taken into account by the tags whose counting cycle lock bit is not yet active. In this case, the tag returns a bit set to 1 for indicating its presence. The interrogator can thus know at any time of the counting cycle whether tags that have not yet been seen are present in its field.

Beginning of list verification: this command prompts the tags, which have already been read at least once and are still present in the interrogator's field, to respond present at the call for their sequence number. This command scans the sequence numbers by retransmitting a reading 0, or reading 1, message when the tag corresponding to the current sequence number has not answered or did answer by transmitting 1. These messages time the automatic incrementing of the sequence number currently being verified in the counter located inside each tag that has not yet responded. When the tag has responded, it locks its counting cycle bit and stores the current sequence number that becomes its sequence number.

End of list verification: all sequence number counters and registers are frozen.

What is claimed is:

1. Method for reading a dynamic set of tags, each with a distinct ID code and located in the electromagnetic field of a polling device, the method comprising:

identifying a previously unidentified tag via successive reading of their codes by means of transmitting and receiving signals between the polling device and the tags, characterized in that comprises carrying out a first read cycle during which each tag identified is locked and during which a sequence number is assigned to the tag identified, so as to allow for creating a list of all tags present in the field of the polling device; and carrying out, during subsequent read cycles, an update of the list by reactivating the tags already listed, checking, from the reactivated tags, those tags still present in the field and those tags that have left the field, and adding the tags that have entered the field.

2. Method according to claim 1, characterized in that, when updating the tag list, the sequence numbers of the tags are modified according to when the tags go out of or into the field, the sequence numbers of the list are consecutive.

3. Method according to claim 1, characterized in that the sequence number of any particular tag is determined concurrently by particular tag and by the polling device, from the information exchanged by the tags and the polling device when the tags are identified.

4. Method according to claim 3, characterized in that the sequence number is initialized at the polling device and at each tag.

5. A method for reading a set of tags, each tag comprising a distinct ID code and located in the electromagnetic field of a polling device, the method comprising:
  initially identifying one or more tags present in the field, the step of initially identifying comprising:
    identifying a tag through reading of the ID code, the reading occurring through transmitting and receiving signals between the polling device and the tags;
    placing the read ID code into a list;
    assigning a sequence number to the tag identified;
    placing the identified tag in a list of tags present in the field of the polling device;
    at the tag, locking the tag, the locking keeping the tag from being identified again; and
    updating the list.

6. The method of claim 5, the step of updating comprising:
  unlocking any tags already listed and present in the field;
  checking, from the unlocked tags, those tags still present in the field; and
  changing the list based on the results of the step of checking from the unlocked tags.

7. The method of claim 5, the step of updating comprising:
  checking for new tags present in the field; and
  changing the list based on the results of the step of checking for new tags.

* * * * *

UNITED STATES PATENT AND TRADEMARK OFFICE
CERTIFICATE OF CORRECTION

PATENT NO. : 6,650,228 B1  Page 1 of 1
DATED : November 18, 2003
INVENTOR(S) : François Vacherand and Elisabeth Crochon It is certified that error appears in the above-identified patent and that said Letters Patent is hereby corrected as shown below:

<u>Title page,</u>
Item [54], please replace "AN" with -- AND --.

Signed and Sealed this

Thirteenth Day of April, 2004

JON W. DUDAS
*Acting Director of the United States Patent and Trademark Office*